United States Patent [19]

Lebedev et al.

[11] 4,436,974
[45] Mar. 13, 1984

[54] PIPE RESISTANCE BUTT WELDING APPARATUS

[75] Inventors: Vladimir K. Lebedev; Sergei I. Kuchuk-Yatsenko; Vasily A. Sakharnov; Boris A. Galian; Grigory B. Asoyants; Vladimir I. Tishura, all of Kiev, U.S.S.R.

[73] Assignee: Institut Elektrosvarki Imeni E.O.Patona Akademii Nauk Ukrainskoi SSR, Kiev, U.S.S.R.

[21] Appl. No.: 294,416

[22] Filed: Aug. 19, 1981

[51] Int. Cl.³ .................. B23K 11/04; B23K 37/04
[52] U.S. Cl. .................................. 219/66; 219/101; 219/97; 219/61.1
[58] Field of Search ............... 219/66, 78.15, 97, 101, 219/61.1,60.2; 83/914

[56] References Cited

U.S. PATENT DOCUMENTS 4,273,985  6/1981  Paton et al. ............... 219/66
4,323,752  4/1982  Paton et al. ............... 219/97

FOREIGN PATENT DOCUMENTS 950258  2/1964  United Kingdom ............ 219/60.2

Primary Examiner—B. A. Reynolds
Assistant Examiner—Catherine M. Sigda
Attorney, Agent, or Firm—Fleit, Jacobson, Cohn & Price

[57] ABSTRACT

A pipe resistance butt welding apparatus comprises a body with an elongated carrying member and two internal expanding clamps including current-feeding shoes. One of the clamps is rigidly attached to the body, whereas the other is movably mounted on the elongated carrying member and connected with a drive intended to communicate reciprocating motion to the other clamp. A trimming mechanism for removing flash is mounted on at least one of the internal expanding clamps. The body of the apparatus mounts centering supporting rollers and driving wheels, the former and the latter being secured thereto by means of spring-loaded levers. The driving wheels are connected with a rotation drive intended to rotate the wheels. The body carries a powder cylinder and spring-loaded three-arm rockers, the latter being turnably mounted. The first arm of each of said three-arm rockers carries a driving wheel, the second arm carries an additional supporting roller, and the third arm is connected with a rod of the power cylinder.

3 Claims, 2 Drawing Figures

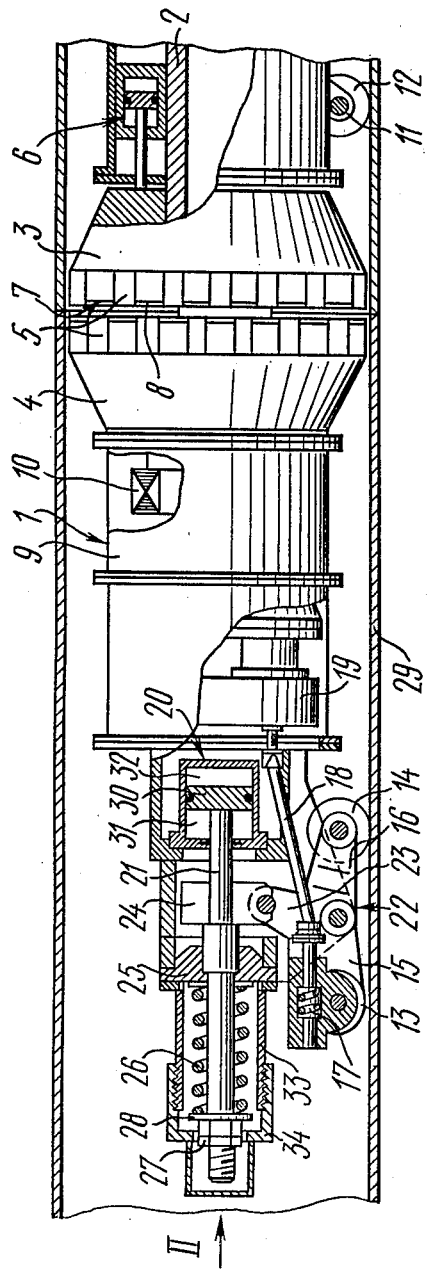
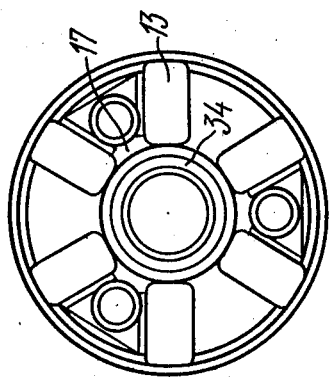
FIG.1
FIG.2

PIPE RESISTANCE BUTT WELDING APPARATUS

BACKGROUND OF THE INVENTION

1. Field of the Invention

The present invention relates to welding equipment and particularly to pipe resistance butt welding apparatus adapted for displacement within the pipes being weld-joined.

Most advantageously the invention can be used for welding large diameter pipes in laying oil- and gas pipelines.

One of the problems encountered in operating conventional in-pipe welding apparatus consists in that it is rather difficult to manipulate them when removing flash, or when the apparatus drive fails.

2. Description of the Prior Art

Many attempts have been made to provide apparatus which allow a welding process to be mechanized. For a long period of time, primary emphasis was given to mechanization and automation of displacement of the welding torches or electrodes along the edges of pipe ends being welded together. The apparatus designed for this purpose practically simulated the movements of the operator but failed to appreciably enhance the welding efficiency (see U.S. Pat. No. 3,277,567) because of the principle followed which consisted in that in order to weld the edges of the pipe ends together, the space therebetween had to be filled with the metal of the electrode being melted.

The method of resistance butt welding has permitted the welding efficiency to be appreciably enhanced. To realize this method, welding apparatus were developed which can be subdivided into three types:

(1) out-of-pipe welding apparatus where all the apparatus' devices are disposed outside of the pipes being welded together;
(2) in-pipe welding apparatus;
(3) combined welding apparatus.

The practice has shown that in laying trunk pipelines over an off-road terrain, preferable are in-pipe welding apparatus, because the inside surface of pipes is an ideal guide for moving such apparatus within the pipes being butt weld. This same factor favours a more accurate alignment of the pipes and enhances the efficiency of the butt welding process.

Known in the art is an in-pipe apparatus for pipe resistance butt welding (see USSR Inventor's Certificate No. 286,103), comprising a body with an elongated carrying member. The apparatus has two internal expanding clamps consisting of current-feeding shoes. One of said clamps is rigidly attached to the body, whereas the other is movably mounted on the elongated carrying member and connected with a drive intended to enable reciprocating motion of said other clamp. A trimming mechanism for removing flash is mounted on the internal expanding clamps. Also, the apparatus has centering supporting rollers and driving wheels. The centering supporting rollers are mounted on the body by means of spring-loaded levers so as to be constantly pressed against the internal surface of the pipes being welded. The driving wheels are mounted on the body of the apparatus with the aid of spring-loaded levers so as to be constantly pressed against the inside surface of the pipes being butt-welded. Thus, the driving wheels support one end of the apparatus. The driving wheels are connected with a rotation drive enabling rotation of said wheels.

The main disadvantage of the above-described welding apparatus consists in the following. If the rotation drive providing for the movement of the apparatus within the pipes becomes disabled, a great tractive force is required to withdraw the apparatus from the pipe. This derives from the fact that in the course of withdrawing the apparatus from the pipe the driving wheels induce rotation of the transmission and the rotation drive, and these latter create a high resistance to the wheels rolling. At the same time, it is essential that the driving wheels be in contact with the inside surface of the pipe to insure against the apparatus displacement under gravity at inclined sections of the pipeline. It will be understood that the constant contact between the wheels and the inside surface of the pipe is also necessary for maintaining and centering of one end of the apparatus.

The constant contact between the driving wheels and the inside surface of the pipe also presented a problem in a flash removal. In particular, the resistance created by the rotation drive and the transmissions had to be overcome by the drive enabling reciprocating motion of the clamps carrying the trimming mechanism.

SUMMARY OF THE INVENTION

The principal object of the present invention is to provide a pipe resistance butt welding apparatus which is easy to withdraw from the pipeline in case the drive enabling rotation of the driving wheels fails to operate.

Another object of the present invention is to provide a pipe resistance butt welding machine which makes it possible to relieve the drive enabling reciprocating motion of the clamps from the resistance of the driving wheels in the course of removing flash.

Still another object of the present invention is to reduce the waste of time if the drive enabling rotation of the driving wheels fails to operate.

These and other objects of the present invention are attained by providing a pipe resistance butt welding apparatus comprising a body with an elongated carrying member mounting two axially movable internal expanding clamps consisting of current-feeding shoes, one of said clamps being rigidly attached to the body, whereas the other being movably mounted on the elongated carrying member and connected with a drive intended to enable reciprocating motion of said other clamp, a trimming mechanism intended for removing flash and mounted on at least one of said internal expanding clamps, centering supporting rollers mounted on the body by means of spring-loaded levers and kinematically connected with a rotation drive enabling rotation of said wheels, wherein, according to the invention, on the body there are mounted a power cylinder and three-arm rockers, the first arm of each of said rockers serving as a lever carrying the driving wheel, the second arm carrying an additional supporting roller, and the third arm being connected with the rod of the power cylinder.

If the drive enabling rotation of the driving wheels fails to operate, the driving wheels are drawn from the internal surface of the pipe by a power cylinder connected to a hydraulic system or a pneumatic system. The apparatus in this case is held centered by additional supporting rollers which do not impede the withdrawal of the apparatus from the pipeline. In a similar manner the driving wheels may be backed away from the internal surface of the pipe when removing flash. It is to be noted that in other cases, for instance if the apparatus is at an inclined section of the pipeline, the power cylinder is disconnected from the hydraulic or pneumatic system and the driving wheels are pressed against the inside surface of the pipe by means of the spring-loaded levers, thus preventing the apparatus from displacement by gravity.

The above factors make it possible to reduce the waste of time in case a breakdown of the apparatus occurs and make the apparatus more suitable for operation.

It is advisable that the driving wheels be resiliently pressed against the internal surface of the pipe being welded, whereas the additional supporting rollers be held disengaged therefrom by means of a common spring bearing up against the body and the lip of the rod of the power cylinder. Such arrangement of the apparatus is the simplest and most reliable in operation.

BRIEF DESCRIPTION OF THE DRAWINGS

The invention will now be explained in greater detail with reference to embodiments thereof which are represented in the accompanying drawings, wherein:

FIG. 1 shows a general view of the pipe resistance butt welding apparatus partially in section in a first operating condition;

FIG. 2 shows the pipe resistance butt welding apparatus as viewed in the direction of arrow II in FIG. I of the accompanying drawings in a second operating condition.

DETAILED DESCRIPTION OF THE INVENTION

A pipe resistance butt welding apparatus comprises a body 1 (FIG. 1) with an elongated carrying member 2 and internal expanding clamps 3 and 4 consisting of current-feeding shoes 5. The clamp 4 is rigidly attached to the body 1, whereas the clamp 3 is movably mounted on the elongated carrying member 2 and is connected with a drive 6 intended to enable reciprocating motion of said clamp 3. The clamps 3 and 4 carry a trimming mechanism 7 for removing flash. The trimming mechanism 7 may be variously constructed (for example, in the form of milling cutters), but considered here and hereinbelow will be only one modification of the apparatus incorporating such trimming mechanism made in the form of cutters 8 arranged in a chess-board fashion on the clamps 3 and 4. It will be understood that the cutters 8 of the trimming mechanism 7 can be mounted either on both of the clamps 3 and 4, or on one of them.

The body 1 incorporates a pumping station 9 and an arc welding transformer 10 electrically connected with the internal expanding clamps 3 and 4, namely with the current-feeding shoes 5.

One end of the body carries circumferentially arranged spring-loaded levers 11. The levers 11 mount centering supporting rollers 12. The levers 11 are arranged in a radial fashion so that each of the angles therebetween is equal to 120°.

The other end of the body 1 carries driving wheels 13 and additional supporting rollers 14. The driving wheels 13 are fitted to spring-loaded levers 15, and the additional supporting rollers 14, on spring-loaded levers 16. Thus near each of the driving wheels 13 there, according to the invention, is mounted an additional supporting roller 14. The number of the driving wheels 13 and the additional supporting rollers 14 depends on the apparatus size and weight. The driving wheels 13 and the additional supporting rollers 14 are fitted to the radially extending levers 15 and 16 in such a fashion as shown in FIG. 2.

The driving wheels 13 are kinematically connected through a worm gear 17 and a gimbal gear 18 with a rotation drive 19 enabling rotation of said wheels 13. The rotation drive 19 is a hydraulic motor installed on the body 1 for communication with the pumping station 9.

The body 1, according to the invention, mounts an axially extending power cylinder 20 whose rod 21 is kinematically connected with the levers 15 and 16.

The driving wheels 13 and the additional supporting rollers 14 are mounted on three-arm rockers 22. One first arm of each rocker 22 is a lever 15 carrying the driving wheel 13. The second arm of each rocker 22 is a lever 16 carrying the additional supporting roller 14. The third arm 23 of each rocker 22 is kinematically connected with the rod 21 of the power cylinder 20, for which purpose clamped onto the rod 21 is a disc 24 provided along its circumference with slots for interaction with cylindrical protrusions of the arms 23 of the rockers 22.

The rod 21 is installed so as to pass through a guiding hole of an additional supporting element 25 secured to the body 1. A cylindrical spring 26 is fitted onto the rod 21. The end of the rod 21 is a threaded portion which is provided with a lip 28, such as a washer, secured thereto by nuts 27. The cylindrical spring 26 bears up against the body, namely against the additional supporting element 25, with one of its ends and against the lip 28 of the rod 21 with the other of its ends. In this way, one cylindrical spring 26 presses all the driving wheels 13 to the inside surface of the pipe 29 being welded as illustrated in FIG. 2, and at the same time holds the additional supporting roller 14 in spaced relationship therewith.

The power cylinder 20 is connected to the main and emergency hydraulic or pneumatic system (not shown). A piston 30 divides the inner space of the power cylinder 20 into spaces 31 and 32.

The spring 26 is enclosed within a bush 33 which is provided with a cup 34 screwed thereonto and covering the threaded portion of the rod 21.

The above-described apparatus operates in the following way.

The pumping station 9 (FIG. 1) activates the rotation drive 19 which communicates rotation to the driving wheels 13 through the gimbal drive 18 and the worm gear 17 and thereby causes the apparatus to move from the finished butt weld to the open end of the pipeline. The end of the apparatus is pulled out of the welded pipeline so as to fit over it the next pipe to be welded. The apparatus is arranged so that the edges of the pipes to be welded are disposed between the internal expanding clamps 3 and 4.

The clamps 3 and 4 expand until the current-feeding shoes 5 are against the inside surface of the pipeline and the pipe to be welded thereto and thus center the pipe to be welded with respect to the pipeline. The centering supporting rollers 12 and the driving wheels 13 also aid in the centering process. When the pipe to be welded is in alignment with the pipeline, the working medium is fed under pressure from the hydraulic or pneumatic system into the space 31 of the power cylinder 20. The piston 30 of the power cylinder 20 moves together with its rod 21 to the right, thereby displacing the disc 24 and compressing the cylindrical spring 26. The disc 24 acts upon the arms 23 of the rockers 22 and turns the latter so that the additional supporting rollers 14 are pressed against the inside surface of the pipe, whereas the driving wheels 13 back away therefrom, as illustrated in FIG. 1.

Now the current is fed from the arc welding transformer 10 to the current-feeding shoes 5 of the clamps 3 and 4. The action of the current heats and fuses the ends of the pipe 29 and the pipeline. At this moment the drive 6 operates so as to pull the clamp 3 towards the clamp 4. The clamp 3 pulls the pipe being welded, thereby upsetting the fused ends of the pipe 29 and of the pipeline. In this way a butt weld is formed. By moving the clamp 3 up to the clamp 4 the formed flash is removed with the aid of the cutters 8 of the trimming mechanism 7.

Now the current-feeding shoes 5 of the clamp 3 and clamp 4 come to their initial position. The space 31 of the power cylinder 20 is connected then to a discharge pipe (not shown). As this takes place, the spring 26 displaces the rod 21 together with the disc 24 to the left. The disc 24 turns the rockers 22 so that the driving wheels 13 are pressed against the inside surface of the pipe. The drive 19 operates enabling rotation of the driving wheels 13, and the apparatus moves towards the next butt joint to be welded. Henceforth, the apparatus operates in a similar manner.

If necessary, the force of pressing of the driving wheels 13 against the inside surface of the pipe is regulated by nuts 27.

While particular embodiments of the invention have been shown and described, various modifications thereof will be apparent to those skilled in the art and therefore it is not intended that the invention be limited to the disclosed embodiments or the details thereof and the departures may be made therefrom within the spirit and scope of the invention as defined in the claims.

What is claimed is:

1. A pipe resistance butt welding apparatus comprising:
    (a) a body having an elongated carrying member;
    (b) an internal expanding clamp including current-feeding shoes and rigidly attached to said body;
    (c) an internal expanding clamp including current-feeding shoes and movably mounted on said elongated carrying member for axial motion;
    (d) a drive intended to enable reciprocating motion of said internal expanding clamp mounted on the elongated carrying member;
    (e) a trimming mechanism for removing flash, mounted on at least one of said internal expanding clamps;
    (f) centering supporting rollers mounted on the body by means of spring-loaded levers;
    (g) three-arm rockers rotatably mounted on said body, spring-loaded, and having three arms;
    (h) driving wheels mounted on the first arms of said three-arm rockers so as to be movable between first positions engaged with the internal surface of pipe being welded and second positions disengaged from the internal surface;
    (i) a rotation drive enabling rotation of said wheels and mounted on said body;
    (j) additional supporting rollers mounted on the second arms of said three-arm rockers so as to movable between positions disengaged from the internal surface and positions engaged with the internal surface, said additional supporting rollers being in the disengaged positions thereof when said driving wheels are in engaged positions and said additional supporting rollers being in the engaged positions thereof when said driving wheels are in disengaged positions; and
    (k) a power cylinder mounted on said body and having a rod connected with the third arms of said three-arm rockers for controlling movement of said three-arm rockers.

2. An apparatus as claimed in claim 1, further comprising means for resiliently pressing said driving wheels against the internal surface of the pipe being welded, the additional supporting rollers being held disengaged from the internal surface by said means for resiliently pressing.

3. An apparatus as claimed in claim 1, further comprising a spring exerting a force on said rod of said power cylinder so that said rod urges said driving wheels against the internal surface of the pipe being welded and disengages said additional supporting rollers from contact with the internal surface.

* * * * *